United States Patent [19]

Cannon, Jr. et al.

[11] 4,451,193
[45] May 29, 1984

[54] WHEEL LIFT APPARATUS

[75] Inventors: Fleming V. Cannon, Jr., Flintstone, Ga.; Frankie E. Casteel, Soddy Daisy, Tenn.

[73] Assignee: Dover Corporation, Chattanooga, Tenn.

[21] Appl. No.: 411,604

[22] Filed: Aug. 26, 1982

[51] Int. Cl.³ .............................................. B60P 3/12
[52] U.S. Cl. ..................................... 414/563; 280/402
[58] Field of Search ............................... 414/426–428, 414/563; 280/402

[56] References Cited

U.S. PATENT DOCUMENTS 3,434,607  3/1969  Nelson ................................. 414/563
3,924,763  12/1975  Pigeon ................................. 414/563

*Primary Examiner*—Robert G. Sheridan
*Attorney, Agent, or Firm*—Alan Ruderman

[57] ABSTRACT

A towing vehicle that has a tiltable boom includes wheel lift apparatus including a support plate adapted for attachment to the bumper of the towing vehicle and carrying a slideway receiving a vertically moveable slide gate and a lifting beam pivotably mounted on the gate for rotational movement from a stored position within the bed of the towing vehicle to operative positions extending rearwardly of the towing vehicle. The support carries pivotable legs moveable by linkage attached to the beam, the legs having sockets for receiving lugs secured to the beam when the beam is in the operative positions. When the beam is in the operative positions the gate may be lowered to drop the beam for loading a disabled vehicle onto wheel receiving members carried by the beam. The gate is thereafter raised together with the beam for towing the disabled vehicle. The gate is raised and lowered by the tiltable boom or a winching cable and the legs preclude the beam from tilting downwardly.

9 Claims, 5 Drawing Figures

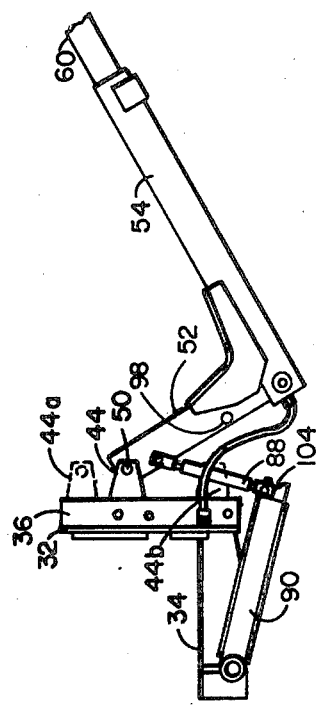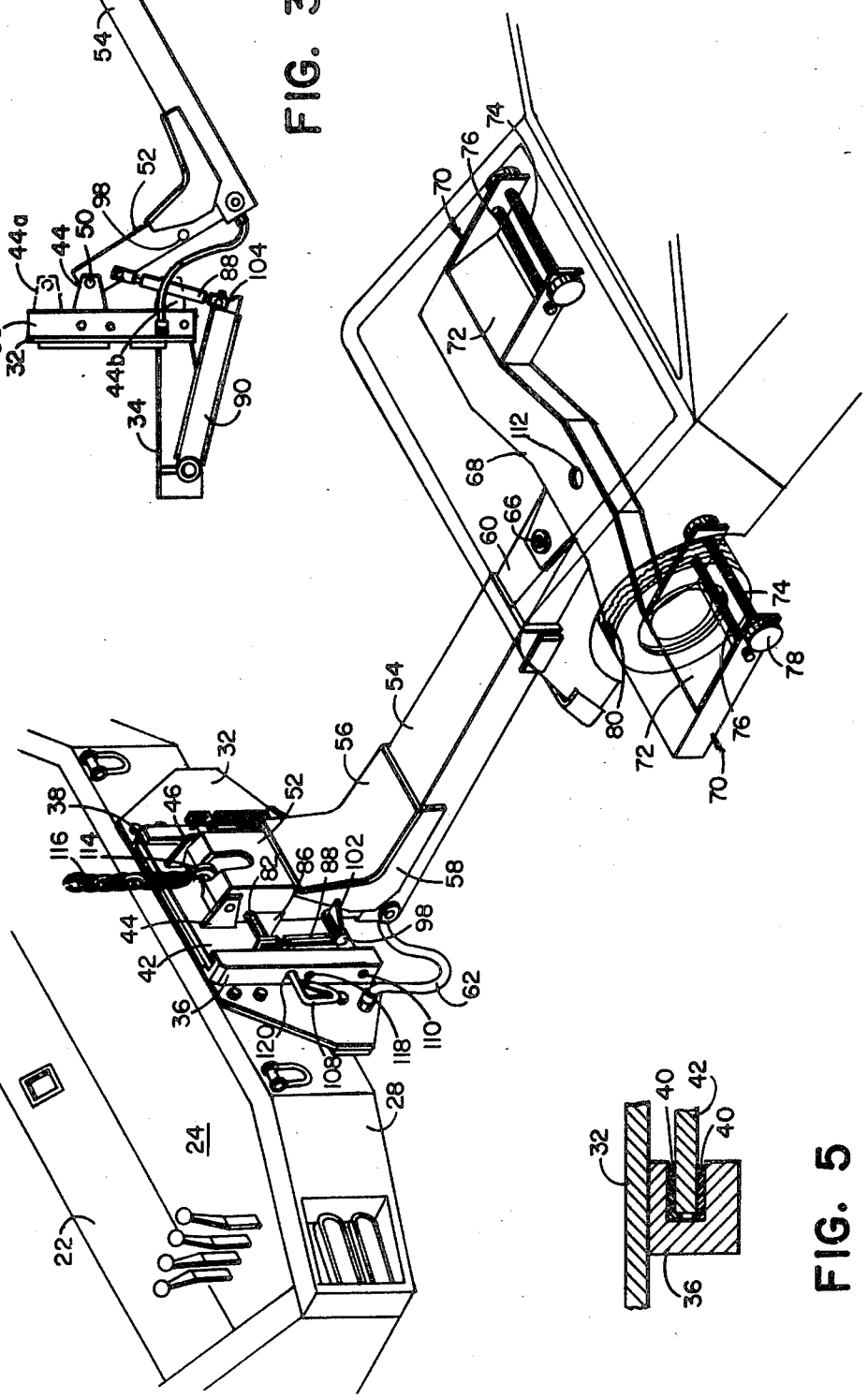

WHEEL LIFT APPARATUS

BACKGROUND OF THE INVENTION

This invention relates to vehicle lifting and towing apparatus and more particularly to apparatus of this type adapted to be attached to a towing vehicle for engaging the wheels of a disabled vehicle for lifting and towing, and which can be pivotably folded to a storage position within the bed of the towing vehicle.

Towing vehicles that hoist and tow disabled vehicles include apparatus generally known as a "wrecker". Such apparatus includes a tiltable boom, a winch, winching cable including a hook at its end, and means for raising and lowering the boom and for driving the winch to pay out and retract the cable. The common way for hoisting and towing a disabled vehicle is to attach the hook to the vehicle at the bumper or undercarriage and thereafter to retract the cable until it is taut and then to raise the boom. However, with the recent use of large amounts of plastic materials on the front and rear body portions and bumpers of automobiles, the conventional method of hoisting and towing can result in damage to these fragile plastic elements. Consequently, it is best to grip, hoist and tow these vehicles by wheel lift devices that engage and lift the front or rear wheels. Such devices must extend rearwardly from the towing vehicle a sufficient distance to engage the wheels without any part of the towing vehicle or devices contacting the body portion or bumper of the towed vehicle.

Although various towing devices that extend from the towing vehicle to lift either the wheels or the undercarriage of the vehicle have been known for some time, the known types either have elements that, when not in use for towing, extend substantially beyond the rear of the towing vehicle and constitute a safety hazard while also precluding use of the same towing vehicle for conventional hoisting and towing, or must be disassembled for storage and reassembled for use, thereby necessitating not only additional time prior to and subsequent to the towing operation, but also additional skill in ensuring that the device is properly assembled when in use. An example of this latter construction is illustrated in Wagner U.S. Pat. No. 3,182,829 which is a wheel lift cradle. Examples of the former type are illustrated in Holmes, et al U.S. Pat. No. 2,183,478 and Wiley U.S. Pat. No. 2,726,777 which engage and lift the undercarriage of the towed vehicle; and Gaumont U.S. Pat. No. 3,285,443; Nelson U.S. Pat. Nos. 3,434,607 and 3,434,608; Peck U.S. Pat. No. 3,951,280; and Pigeon U.S. Pat. No. 3,924,763, which lift the wheels, and in the case of Gaumont may lift the bumper. In Peck, Pigeon and Nelson U.S. Pat. No. 3,434,608 the towing devices do not fold back in to the bed of the towing vehicle but remain substantially extended therefrom. In the others, parallelogram linkages permit limited movement of the elements allowing portions of the device to be stored in the towing vehicle bed, but substantial portions of the device extend outside the rear of the vehicle. In Holmes, et al and Wiley, although the lifting arms fold back manually into the towing vehicle bed, they are prevented from lying flat out of the way by the nature of the parallelogram linkage, and thus interfere with the operation of the boom for conventional bumper or undercarriage lifting.

SUMMARY OF THE INVENTION

Consequently, it is a primary object of the present invention to provide apparatus adapted to be attached to a towing vehicle that in the operative position can be extended beneath a vehicle to be lifted and towed and which when inoperative may be stored conveniently within the bed of the towing vehicle.

It is another object of the present invention to provide hoisting and towing apparatus adapted to be attached to a towing vehicle and having hoisting arms extendible beneath a disabled vehicle and lifted by the wrecker on the towing vehicle to hoist and tow the disabled vehicle, and which has means for pivoting the hoisting arms to within the bed of the towing vehicle to be stored in a substantially flat position when inoperative.

It is a further object of the present invention to provide wheel lift apparatus adapted to be attached to the rear of a towing vehicle and pivotable from a stored position within the bed of the towing vehicle to a loading position, the apparatus having arms positionable beneath a disabled vehicle to engage the wheels thereof, and thereafter liftable to a towing position for hoisting and towing the disabled vehicle.

It is a still further object of the present invention to provide a vehicle hoisting and towing apparatus including a lifting beam pivotably mounted on a slide gate carried by a support housing adapted to be secured to the rear of the towing vehicle, the lifting beam having vehicle lifting arms extendible beneath a disabled vehicle when the slide gate is lowered and liftable with the slide gate by means of the towing vehicle boom to hoist and tow the disabled vehicle, the slide gate being positionable relatively to the towing vehicle and the beam being pivotable relatively to the slide gate to position the beam and arms within the bed of the towing vehicle for storage when not in use so that the beam and arms do not extend beyond the rear of the towing vehicle and do not interefere with the operation of the towing vehicle boom.

Accordingly, the present invention provides towing apparatus including a support attachable to the rear of a towing vehicle that has a tiltable boom, the apparatus comprising a slide gate slidable within a slideway carried by the support, and a beam pivotably mounted on the slide gate and carrying extendible members for engaging and supporting a disabled vehicle to be towed, preferably at the wheels. The beam may be stored within the bed of the towing vehicle and pivotable outwardly therefrom to operative positions, the slide gate thereafter being lowered so that the extendible members engage the disabled vehicle, the slide gate thereafter being liftable to hoist the disabled vehicle to the towing position. Since the slide gate is remote from the disabled vehicle the means for lifting the gate, whether cables or chains, will not contact and damage the disabled vehicle. When inoperative the slide gate may be positioned so that the beam and disabled vehicle engaging members may be pivoted to a disposition within the bed of the towing vehicle. The support may carry pivotable legs moveable by linkage carried by the beam, the legs having means which, in the loading and towing positions, act as stops to receive cooperating members on the beam for providing support against the tilting force on the beam exerted by the load of the towed vehicle. The beam has a configuration such that in the stored position a portion of the beam extends rearwardly no more than the slideway housing, while the remainder of the beam is positioned on the bed of the towing vehicle with the disabled vehicle engaging members disposed on opposite sides of the boom. Thus, the towing vehicle may also be used conventionally to hoist and tow a vehicle by its bumper or undercarriage without interference by the wheel lift apparatus, and since no element of the apparatus extends beyond the slideway housing, a safety hazard is not presented when the towing vehicle is not utilized for towing.

BRIEF DESCRIPTION OF THE DRAWINGS

The particular features and advantages of the invention as well as other objects will become apparent from the following description taken in connection with the accompanying drawings, in which:

FIG. 3 is an elevational view of a portion of the wheel lift apparatus, the slide gate being shown in the stored position by the solid lines, and in the tow and loading positions by the dotted lines, the beam being in a position intermediate the stored and loading position;

FIG. 4 is a view similar to FIG. 1 with the wheel lift apparatus in the towing position; and FIG. 5 is a horizontal sectional view illustrating a portion of the slideway and the slide gate of the wheel lift apparatus.

DESCRIPTION OF THE PREFERRED EMBODIMENT

Figures 1, 2:
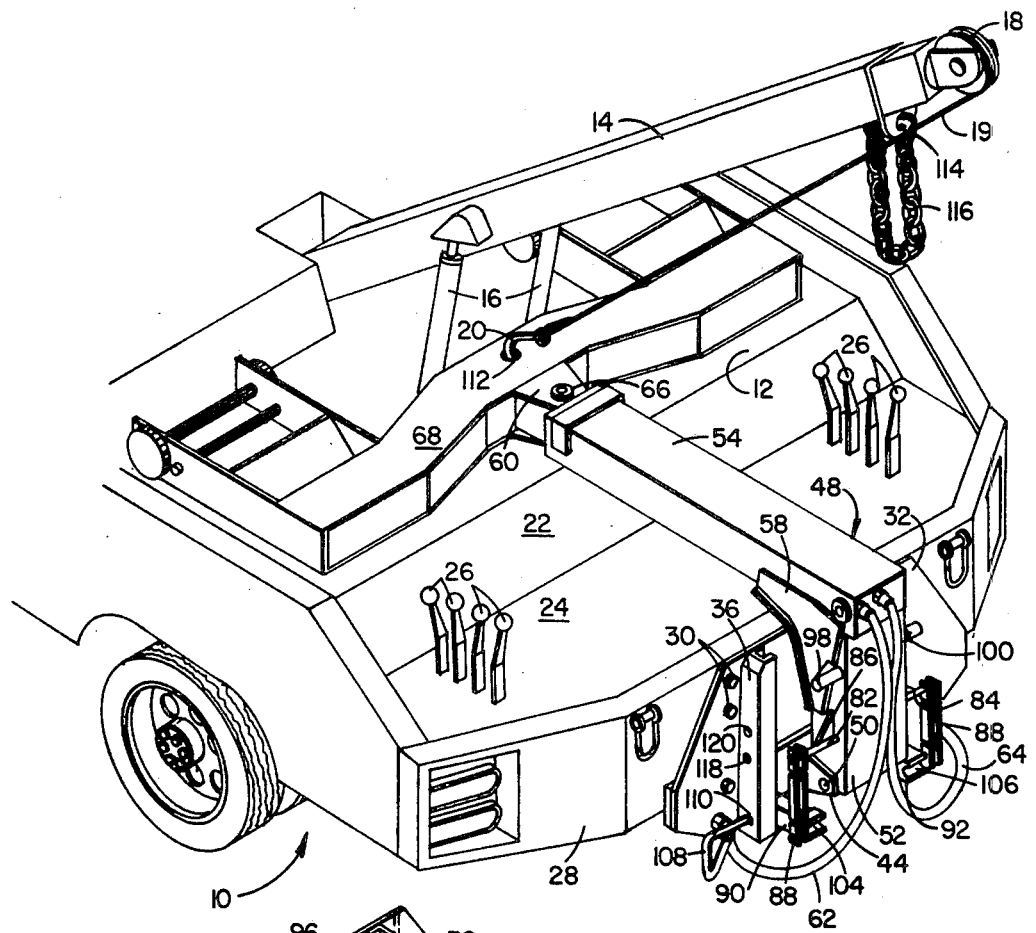
FIG. 1 is a perspective view of a portion of a towing vehicle incorporating wheel lifting apparatus constructed in accordance with the principles of the present invention, the apparatus being illustrated in the stored position.
FIG. 2 is a perspective view of the wheel lift apparatus of FIG. 1 pivoted and extended to the loading position.

Referring to the drawings, and in particular to FIG. 1, the rear portion of a towing vehicle 10 is illustrated with the wheel lift apparatus in the stored position in the bed 12 of the vehicle. The towing vehicle conventionally includes a boom 14 pivotably mounted in the bed 12, the boom being tiltably raised and lowered by power means such as hydraulic cylinders 16. The free end of the boom rotatably carries one or more pulleys 18 about which one or more cables 19 are trained. The end of the cable(s) carry a respective hook 20 which may be paid out or retracted with the cable(s) by conventional power winching means (not illustrated). At the end of the bed 12 beneath the boom, the towing vehicle includes a tool box compartment having a hinged cover 22 which steps down to a work platform 24, on each end of which control members 26 are mounted for operating the power drives for the boom, winch and other power driven members. On the rear end of the bed a conventional towing vehicle bumper 28 is mounted beneath the work platform 24.

Secured to the bumper 28 by conventional means such as bolts 30 or the like is a housing support plate 32 to which a forwardly extending plate 34 is welded and which in turn is bolted or welded to the underside of the bed 12. At horizontally spaced locations a pair of slide housings in the form of rails 36, 38 are welded to the forward face of the housing support plate 32. Each slide housing 36, 38 comprises a vertically elongated U-shaped channel having the channel openings facing each other to define a slide track. Positioned adjacent each wall of each housing channel may be slide bearings 40 of a bearing material such as nylatron or fluro carbon, and a slide gate in the form of a plate 42 is slidably received between the bearings for vertical slidable movement in the slide track. The slide gate 42 includes a pair of spaced ears 44, 46 secured thereto which pivotably carry the lifting beam generally indicated at 48 on an axle 50 spanning the ears 44,46.

The lifting beam 48 basically comprises a first beam member 52, that being the member mounted on the axle 50, and a second beam member 54 substantially normal to the first member 52 and welded thereto. To strengthen the connection between the beams 52 and 54, structural plate members such as 56 and 58 may be fastened to both the beams. Moreover, rather than the lifting beam comprising two members, if desirable, it may comprise a single member bent to the desired shape, i.e., bent at an angle substantially equal to the angle the plane of the rear of the bumper 28 makes with the plane of the bed 12 so that the beam member 54 lies flat in the bed 12 when the member 52 is disposed against the bumper 28 in the stored position. The second beam member 54 generally is hollow and telescopically receives a lifting arm 60 which may be extended or retracted by hydraulic cylinders (not illustrated) carried within the beam 54 and to which pressurized hydraulic fluid is delivered and returned through lines 62, 64, and controlled by one or more of the control levers 26. Pivotably connected at 66 to the lifting arm 60 is a yoke member 68 having wheel receiving and supporting troughs 70 of any convenient configuration. As illustrated the trough, although not within the scope of the present invention, may include a tire restraining member 72, rotatable tire mounts 74, 76, and drum members 78 that can roll along the ground into engagement with the tires 80 of the disabled vehicle 82. Other trough configurations are illustrated in the aforesaid Pigeon U.S. Pat. No. 3,924,763 and Nelson U.S. Pat. No. 3,434,607, or rather than a trough design pivotable yoke members may be used.

Secured to the beam member 52 and extending outwardly at each side thereof is a rod 82, 84 respectively, the connection between the rod and the member 52 being strengthened by webs 86. At the free end of each rod 82, 84, one end of a linkage such as a turnbuckle 88 is pivotably secured, each turnbuckle being pivotably connected at its other end to an end of a pivotable support leg 90, 92 respectively. As best illustrated in FIG. 2, the other end of each support leg 90, 92 is pivotably connected to a respective plate 94, 96 secured to and extending downwardly from the plate 34, the pivot axis of the legs 90, 92 being substantially parallel to the rods 82, 84 and the axle 50. Thus, when the lifting beam 48 pivots about the axle 50, the linkage 88 pivotably moves the legs 90, 92 about the pivot connection with the respective plate 94, 96. Also secured to the beam member 52 and extending outwardly from each side thereof substantially parallel to the rods 82, 84 is a respective lug 98, 100 braced to the beam 52 by means of strengthening webs 102. The lugs 98, 100 are disposed such that they engage the linkage end of the respective legs 90, 92 and are received within a respective recess 104, 106 at the end of the legs 90, 92 as the beam 48 pivots downwardly as hereinafter described.

In the stored position the slide gate 42 is disposed, as illustrated in FIG. 1, within the channels of the housing members 36, 38 in an intermediate position illustrated by the solid line of the ear 44 in FIG. 3, a lock bar 108 being positioned within defined store position holes 110 in the housing 36, 38 so that the lock bar is disposed beneath the lower edge of the slide gate 42 and acts as a security pin to ensure that the gate 42 does not inadvertently slip. To move the lifting beam 48 and the wheel support members 60, 68, 70 from the stored position of FIG. 1, the hook 20 is positioned within a hole 112 extending through the yoke 68 and the winch is operated to retract the cable 19 and lift the yoke as the beam 48 pivots about the axle 50. When the beam 48 has pivoted beyond the bed 12 and can no longer pivot the hook 20 may be removed.

As the beam 48 approaches the position where the lugs 98, 100 approach the respective recesses 104, 106 of the lugs 90, 92 the lock bar 108 may be removed (although it may be removed prior thereto) to lower the gate 42 further. After the lugs 98, 100 seat within the recesses 104, 106, the hook 20, if not previously removed, may be removed from the hole 112 and the legs 90, 92 support the beam against further rotation. It may be noted that once the lugs seat in the recesses, they stay seated while the gate is moved. When the gate 42 is lowered and then raised, the legs 90, 92 pivot due to the linkage connection with the beam 48. The legs 90, 92 thus prevent a clockwise tilting of the beam as viewed in the drawings. The cable hook 20 or another hook 114 on the end of a chain 116 attached to the boom 14 may be connected to the slide gate which has dropped down to the lowermost position if the lock bar 108 has been removed, or the hook 114 may be connected to the gate prior to removing the lock bar and may support the gate to slowly drop it to the lowermost position after the lock bar is removed. The lifting structure is then in the loading position as illustrated in FIG. 2 and the towing vehicle is thereafter backed-up to engage the wheel support members 70 with the tires 80 of the disabled vehicle.

After the tires 80 are properly positioned within the support members 70, the slide gate 42 is lifted by either the hook 114 by lifting the boom 14 or by the hook 20 by lifting the boom 14 and/or retracting the cable 19. The gate 42 is lifted to the towing position illustrated in FIG. 4 above the stored position, and the lock bar 108 is inserted within towing position holes 118 or 120 in the housings 36, 38 depending upon the amount of lift required for the disabled vehicle to prevent inadvertent slipping of the gate 42, the bar 108 being disposed beneath the lower edge of the gate. After towing is completed, the lock bar 108 is removed from the towing position holes 118 or 120 and the gate 42 is lowered to the stored position of FIG. 1, the lock bar then is inserted in the holes 110, and the hook 20 inserted within the hole 112 to pivot the beam 48 and yoke 68 back to the stored position. The relative positions of the gate 42 is illustrated by the ear 44 in FIG. 3. The solid line indicates the position of the ear 44 and gate in the store position, while 44a the upper dotted lines indicate the towing position and the lower dotted lines 44b indicate the loading position. In the stored position the yoke 68 is disposed below the boom 14 with the wheel receiving members 70 on opposite sides of the boom. Thus, the boom and cable 19 may be operated for conventional hoisting and towing without interference from the wheel lift apparatus. Moreover, in the stored position the first beam member 52 is disposed between the rails 36, 38 so that the wheel lift structure does not protrude beyond the bumper 26 further than the depth of the rails.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A towing device adapted to be mounted at the rear of a towing vehicle for lifting and towing a disabled vehicle, said device comprising: a support means for rigidly securing said device on the towing vehicle; means defining a slideway carried by said support means; a gate journalled in said slideway for slidable movement relatively to said support means; a beam including extendible lifting means adapted to be placed beneath the disabled vehicle; means for pivotably mounting said beam on said gate for pivotable movement about a substantially horizontal axis remote from said lifting means from a stored position in the rear of the towing vehicle to operative positions extending rearwardly from said towing vehicle; means for raising and lowering said gate between positions corresponding to the stored position of said beam, a loading position whereby said lifting means may be placed beneath the disabled vehicle, and a towing position for transporting the disabled vehicle; and stop means for rigidly supporting said beam in the operative positions to preclude pivotable movement of the beam by the lifting force exerted thereon by the load of the disabled vehicle.

2. A towing device as recited in claim 1, wherein said stop means comprises first abutment means carried by said beam and second abutment means supported beneath the towing vehicle for cooperatively engaging said abutment means when the beam is in the operative positions and for disengaging therefrom as the beam is pivoted to the stored position.

3. A towing device as recited in claim 2, wherein said second abutment means comprises a pivotable lever means, linkage means operatively connected to said beam and to said lever means to pivot said lever means for engaging said first abutment means as said beam is pivoted to the operative positions.

4. A towing device as recited in claim 3, wherein said first abutment means comprises a protuberence extending from said beam along an axis substantially parallel to said substantially horizontal axis, said lever means being pivotably mounted for movement about an axis substantially parallel to said substantially horizontal axis, and said lever means includes socket means for receiving said protuberence and holding said protuberence as said gate is moved between the loading position and the towing position.

5. A towing device as recited in claim 3 or 4, wherein said support means includes a plate member adapted to be secured to a rear end portion of the towing vehicle, a support member secured to said plate member and extending beneath the towing vehicle, said pivotable lever means being carried by said support member.

6. A towing device as recited in claim 1, wherein said slideway comprises a pair of spaced rails secured to said support means, each rail including a substantially vertical channel opening toward the other rail, said gate comprising a plate spanning said rails and having opposite ends disposed in said channels.

7. A towing device as recited in claim 6, wherein said beam comprises a first portion and a second portion disposed angularly relatively to said first portion, said means for pivotably mounting said beam on said gate comprising axle means pivotably connected to said first portion on said gate, said second portion comprising means for carrying said extendible lifting means, the angular disposition of said second portion relative to said first portion being such that when in the stored position the first portion is disposed between said rails and said second portion extends forwardly into the towing vehicle.

8. A towing device as recited in claim 7, wherein said stop means comprises a protuberence extending from said beam along an axis substantially parallel to said substantially horizontal axis, and a pivotable lever means supported beneath the towing vehicle for movement about an axis substantially parallel to said substantially horizontal axis, linkage means operatively connected to said beam and to said lever means to pivot said lever means for engaging said protuberence as said beam is pivoted to the operative position, said lever means including socket means for receiving said protuberence and for holding said protuberence as said gate is moved between the loading position and the towing position.

9. A towing device as recited in claim 7 or 8, wherein said support means includes a plate member adapted to be secured to a rear end portion of the towing vehicle, a support member secured to said plate member and extending beneath the towing vehicle, said pivotable lever means being carried by said support member.

* * * * *